United States Patent [19]

Elsbernd et al.

[11] 4,240,809
[45] Dec. 23, 1980

[54] ELECTROSTATIC PRECIPITATOR HAVING TRAVERSING COLLECTOR WASHING MECHANISM

[75] Inventors: Carl A. Elsbernd, Cincinnati; James C. Bricker, Waynesville, both of Ohio

[73] Assignee: United Air Specialists, Inc., Cincinnati, Ohio

[21] Appl. No.: 29,024

[22] Filed: Apr. 11, 1979

[51] Int. Cl.³ .............................................. B03C 3/78
[52] U.S. Cl. ...................................... 55/118; 55/117; 55/230; 55/242; 55/294; 239/186
[58] Field of Search .................................. 55/117–118, 55/230, 242, 294; 239/185–186

[56] References Cited

U.S. PATENT DOCUMENTS

| | | | |
|---|---|---|---|
| 1,807,950 | 6/1931 | Adams, Jr. et al. | 55/242 X |
| 1,935,295 | 11/1933 | Kauffman | 239/186 |
| 2,414,528 | 1/1947 | Hutchison et al. | 55/118 X |
| 2,615,529 | 10/1952 | Lincoln | 55/118 |
| 2,911,060 | 11/1959 | Rawe | 55/117 |
| 3,159,471 | 12/1964 | Revell | 55/118 |
| 3,159,472 | 12/1964 | Revell | 55/118 |
| 3,266,729 | 8/1966 | Baskett | 239/186 |
| 3,505,792 | 4/1970 | Dahlem | 55/294 |
| 3,592,387 | 7/1971 | Pilott et al. | 239/186 |
| 3,704,571 | 12/1972 | Burney | 55/118 |

*Primary Examiner*—Kathleen J. Prunner

[57] ABSTRACT

An electrostatic precipitator air cleaner including a number of precipitator cells having spaced parallel plates for collecting dirt particles, and a vertically disposed traversing pipe-like spray header containing a number of spray nozzles for directing a spray of wash or rinse fluid onto the collecting plates in order to remove collected particles. The header is traversed horizontally across the precipitator cells by means of a trolley supported by a rail-like guide member and reciprocated between a home position and an extended position by means of a rotating elongated helical drive screw cooperating with a gear-like follower attached to the trolley, such that the rotation of the screw produces linear motion of the header. The header is connected to a source of wash or rinse fluid by means of swivel connections and a flexible conduit. An elongated flat resilient fluid impervious strip containing a longitudinal slit in sliding sealable engagement with the header is positioned between the traversing mechanism and the spray nozzles to prevent infiltration of the precipitator airstream or wash fluid into the area occupied by the traversing mechanism. The threaded follower may also be disengaged from the helical drive screw and the header moved manually to any position along its length of travel.

12 Claims, 7 Drawing Figures

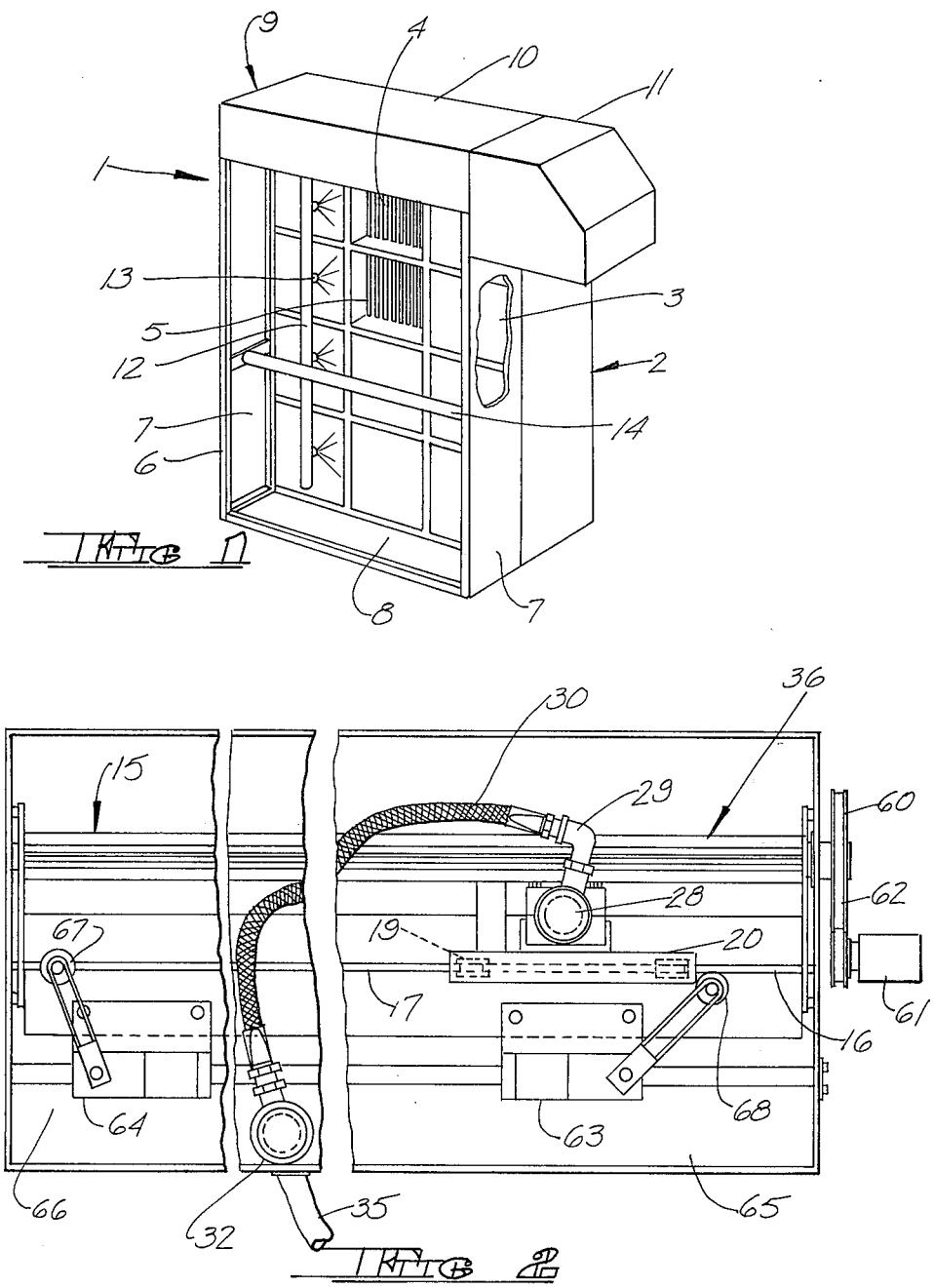

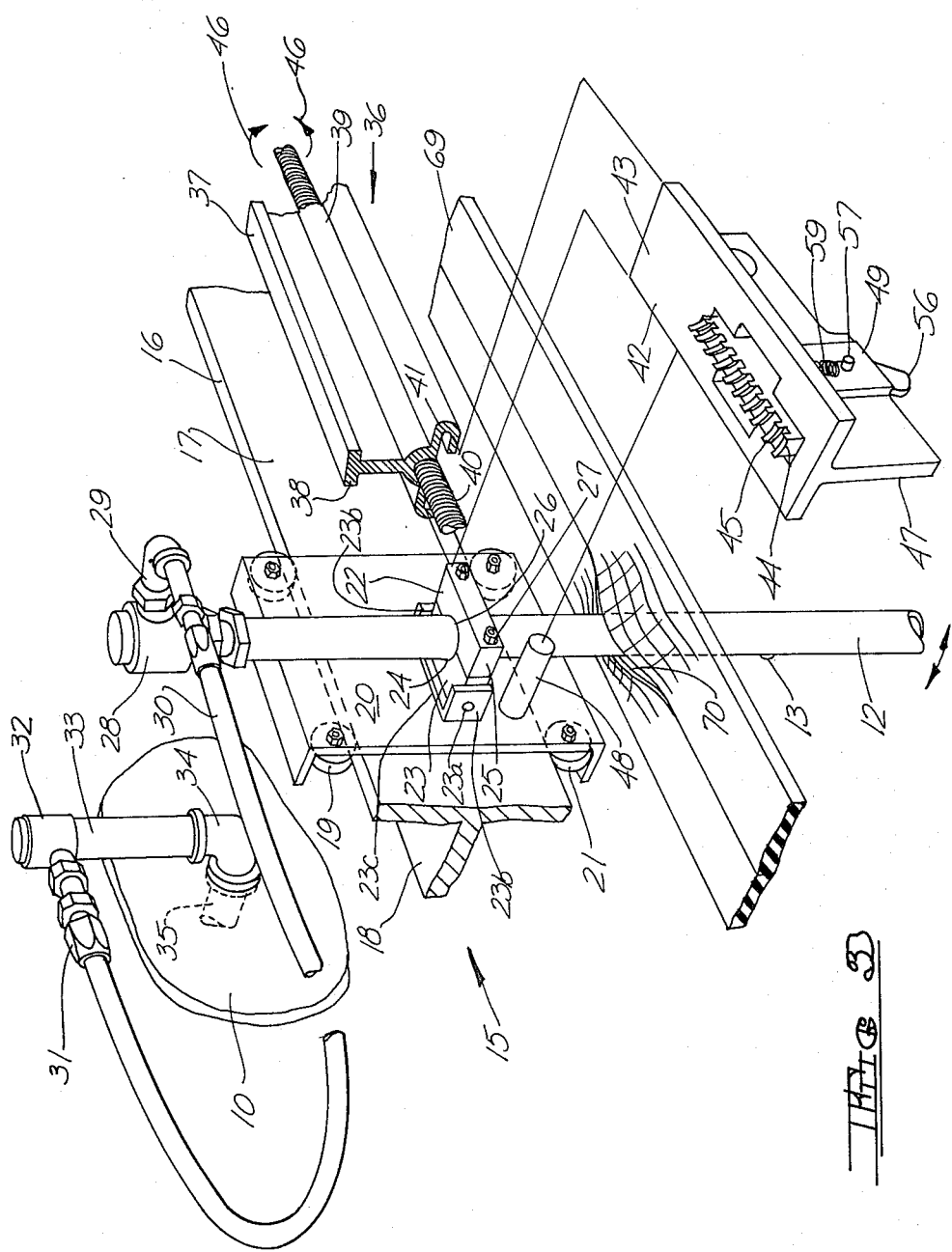

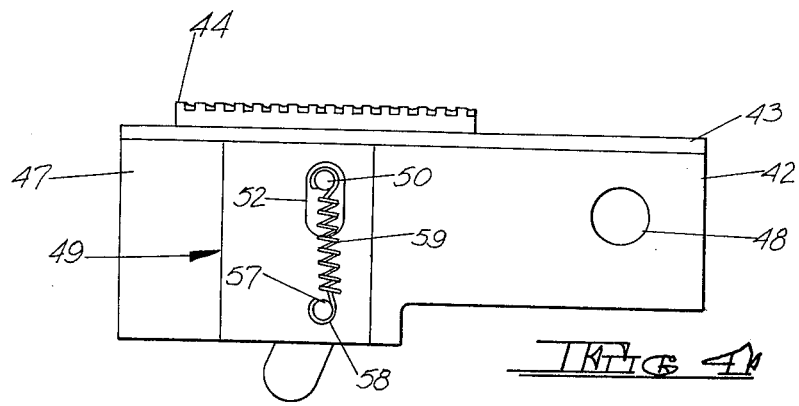
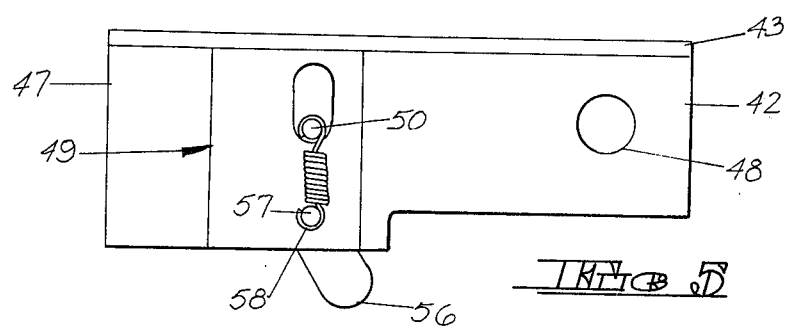
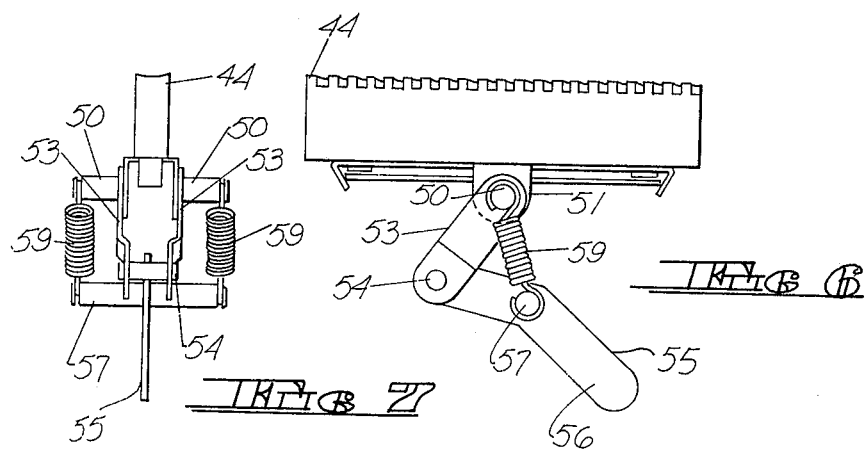

ELECTROSTATIC PRECIPITATOR HAVING TRAVERSING COLLECTOR WASHING MECHANISM

BRIEF SUMMARY OF THE INVENTION

In many commercial and industrial air cleaning applications, a number of individual electrostatic precipitator air cleaning units are arranged in specially designed holding racks to simultaneously remove contaminating particulate material from air moved through the air cleaners by fans or blowers. Each electrostatic precipitator air cleaner includes an ionizing section containing a number of ionizing electrodes charged to a relatively high voltage potential which induces an electric charge on air molecules and dirt particles drawn past the electrodes. The charged particles and air molecules are directed to a collecting cell positioned downstream from the ionizing electrodes which contains a number of charged and uncharged spaced parallel collecting plates which collect the charged particles. The clean air, having been stripped of the contaminating particles, may be returned to the working area by suitable ventilation duct work and the like.

After a period of time, particularly in environments containing heavily polluted air, such as industrial welding operations, the plates in the collecting cell become heavily coated with a layer of collected particulate material. This layer reduces the collecting efficiency of the collecting cell, and may also lead to sparking, arcing or fire hazard in severe cases. Consequently, it has been found advantageous to periodically remove this accumulated layer of particulate matter from the collecting cell.

One common method for cleaning the collecting plates uses a vertically disposed header tube assembly having a plurality of spaced spray nozzles which can be traversed periodically across each electrostatic precipitator air cleaner in order to wash the accumulated particulate matter from the collecting plate by means of a suitable washing fluid. The header tube may traverse the electrostatic precipitator several times in order to provide a multiplicity of washing and rinsing operations. The traverse header tube assembly is commonly drawn across the inlet end of the individual air cleaning units by means of an endless drive chain cooperating with driven sprocket gears. In many situations, it has been found that the header drive chain or other drive mechanism is located within the unfiltered airstream of the air cleaners, and consequently soon becomes encrusted with dirt and grit causing unreliable operation of the drive mechanism. Furthermore, the usual type of endless drive chain employed with such washing mechanisms is difficult to support over long distances, preventing the use of such apparatus with air cleaning installations of extended length.

The present invention overcomes the disadvantages of prior art electrostatic precipitator air cleaner washing systems by utilizing a trolley attached to the upper end of the header pipe which is guided on a rail-like guide member extending the width of the air-cleaner. The trolley is traversed adjacent to the collecting cells of the individual air cleaning units by means of a helical drive screw extending parallel to the rail-like guide member and is rotated in the appropriate direction by an electric motor. The helical drive screw cooperates with a threaded follower connected to the trolley in order to produce linear motion of the follower to move the header across the installation. Limit switches positioned at the end of the header run reverse the direction of rotation of the electric motor in order to reverse the direction of travel of the header pipe. Suitable means may be provided for wash, rinse and dry cycles, as required, as in conventional washing systems.

In a preferred embodiment of the present invention, the driving mechanism is located above and outside of the unfiltered airstream in order to avoid contamination by dirt particles contained in the incoming air. Seal means comprising an elongated flat resilient fluid impervious strip extends across the installation beneath the drive mechanism, with the strip containing a slit running longitudinally so as to permit the header pipe to extend therethrough in a sealing slidable engagement with the sealing strip. This prevents dirt and washing fluid from entering the space occupied by the traversing mechanism.

In a preferred embodiment, washing fluid is directed to the upper end of the header pipe by means of a flexible hose connected at its ends to swivel connections. This arrangement permits the flexible hose to fold back upon itself as the trolley moves along the guide member, and prevents kinking or entanglement of the hose with the drive mechanism. Further details of the invention will become apparent from the detailed description which follows.

BRIEF DESCRIPTION OF THE DRAWING

FIG. 1 is a front cutaway perspective view of the electrostatic precipitator air cleaner of the present invention.

FIG. 2 is a fragmentary top plan view of the electrostatic precipitator air cleaner of FIG. 1 with the upper housing cover removed.

FIG. 3 is an exploded fragmentary perspective view, partially in cross section of the traversing mechanism of the present invention.

FIGS. 4-7 are enlarged detailed views of the latching mechanism and follower of the traversing mechanism of the present invention.

DETAILED DESCRIPTION

FIG. 1 illustrates, generally at 1, the electrostatic precipitator with traversing washing mechanism of the present invention. The electrostatic precipitator comprises a rack-like support structure or housing 2 having a number of vertically and horizontally disposed box-like compartments, one of which is shown at 3. Each compartment 3 houses an electrostatic air cleaner 4 of the type having a collecting cell comprising a number of spaced parallel collecting plates 5 which collect dirt particles charged by an ionizing section (not shown) containing a number of ionizing electrodes charged to a relatively high voltage potential. Blowers or fans (not shown) may also be included as required to move the air through the air cleaner as is well understood in the art.

A vertically standing frame-like plenum support 6 is spaced outwardly from air cleaner support 2. In a typical installation, the vertical sides 7 and bottom 8 of plenum support 6 would be covered with solid sheet metal or the like, while the rear vertical surface of plenum support 6 would be left open to provide free air access to air cleaners 4. In addition, the vertical surface of plenum support 6 spaced from air cleaner support 2 would be provided with suitable duct work (not shown) to connect the electrostatic precipitator 1 to the working area being treated. In normal operation, air flow through precipitator 1 would proceed in a substantially horizontal direction.

Traverse unit 9 is affixed to the upper end of plenum support 6 and comprises a box-like enclosure 10 which overlies the upper end of plenum support 6 and contains the traversing drive mechanism as will be explained in more detail hereinafter, and a second box-like enclosure 11 affixed to one end of enclosure 10 which contains the power train components for the traversing drive mechanism.

The pipe-like traversing spray header 12 extends vertically downwardly from the center of enclosure 10 such that the closed lower end of header 12 is spaced slightly from bottom portion 8 of plenum support 6. As will be explained in more detail hereinafter, the traversing drive mechanism causes header 12 to horizontally traverse the openings in air cleaners 4. Spray header 12 is provided with a plurality of vertically spaced high intensity narrow spray pattern nozzles 13 which direct a fan-shaped spray of washing and rinsing fluids toward air cleaners 4 so as to thoroughly clean accumulated dirt and collected particles from collecting plates 5 as header 12 traverses in a horizontal direction. As illustrated in FIG. 1, header 12 will normally be provided with one spray nozzle 13 for each horizontal row of air cleaners 4; however, a different number of nozzles may be provided as required for particular washing operations.

A horizontally disposed bar 14 may be provided adjacent the lower end of header 12 in order to restrain the movement of the header against the outward force produced by spray fluids issuing from nozzles 13. Bar 14 is so constructed that the outer surface of header 12 is free to slide therealong as the header traverses horizontally.

It will be understood that plenum support 6 and attached traverse unit 9 may be provided as an integral structure with air cleaner support 2, or can be attached to an existing assemblage of air cleaners 4 in order to provide means for washing accumulated dirt and the like from the collecting cell plates.

The details of the spray header traversing mechanism of the present invention are illustrated in FIG. 2–FIG. 7. The traversing mechanism, illustrated generally at 15, includes rail-like drive screw support means comprising a horizontally oriented rail-like guide member or track 16 supported at its ends by the ends of housing 2. Track 16 comprises a vertical web portion 17 and a horizontal web section 18, one edge of web section 18 being attached along its length to approximately the mid-point of vertical web 17 in order to provide structural rigidity for track 16. It will be understood that track 16 may be constructed of separate web portions, or may be formed from a single extruded member or the like. This construction enables the traversing washing mechanism of the present invention to be used with air cleaner installations of considerable length without the need for intermediate supports for track 16.

The upper edge of web 17 supports a pair of spaced wheels 19 rotatably secured to the upper end of vertical plate-like trolley 20. A second pair of spaced wheels 21 are rotatably attached to the lower end of trolley 20 and rest against the lowermost edge of web section 17. This construction permits trolley 20 to freely move along track 16 the width of air cleaner support 2.

As best shown in FIG. 3, vertically disposed traversing spray header 12 is attached to the outermost vertical surface of trolley 20 by means of clamp 22. Clamp 22 comprises a stationary member 23 pivotally secured as at 23a between the outwardly extending arms 23b of c-shaped bracket 23c attached to the vertical surface of trolley 20. Clamp 22 also contains a semi-cylindrical aperture 24 passing therethrough coaxial with header 12. A movable clamp portion 25 contains a semi-cylindrical aperture 26 similar to aperture 24 and is attached to stationary clamp section 23 by means of threaded fasteners 27 or the like. This construction permits the clamp section to be loosened for vertical adjustment of spray header 12 in order to align spray nozzles 13 with the appropriate horizontal rows of air cleaners 4. Furthermore, the pivotal connection between header 12 and trolley 20 permits the header to swing freely, as required, in the direction of the directional arrows appearing in FIG. 3 at the lower end of header 12, reducing the dead load on trolley 20 and lessening the possibility of malfunctions caused by the header becoming jammed during its horizontal travel.

As is best shown in FIG. 3, the upper end of header 12 terminates in a swivel connection 28 which is free to rotate about its vertical axis as header 12 traverses horizontally. A suitable elbow fitting 29 extends from the side of swivel connection 28 and is connected, by means of suitable intermediate fittings, to a flexible hose-like conduit comprising hose 30. The opposite end of flexible hose 30 is connected by means of suitable fittings 31 to a second swivel connection 32. The lower end of swivel connection 32 is connected to a short vertical section of pipe 33, with the lower end of pipe 33 extending through the side wall of enclosure 10 by means of elbow fitting 34. In general, it is preferred that elbow fitting 34 be positioned at approximately the center of housing 10 where convenient connection can be made for introducing wash and rinse fluids to the washing mechanism by means of supply line 35.

It will be understood that this construction permits flexible hose 30 to fold back upon itself as trolley 20 traverses air cleaner support 2, thus eliminating the possibility of the flexible hose 30 kinking or becoming entangled in the traversing drive mechanism.

Trolley 20 is driven along track 16 by means of a helical drive screw traversing mechanism, shown generally at 36. Drive screw mechanism 36 comprises screw support rail 37 which extends parallel to track 16 and is attached at its ends to the ends of housing 10. Screw support rail 37 comprises an elongated generally T-shaped member 38 extending upwardly from a tubular portion 39 which rotatably receives elongated helical drive screw 40. The lowermost ends of tubular portion 39 extend outwardly and are turned under to form a slotted guide channel 41 for slidably receiving and guiding follower 42 as will be explained in more detail hereinafter. It will be understood that the channel-like shape of screw supporting rail 37 allows drive screw 40 to be supported along its entire length and permits operation over extended distances associated with air cleaning assemblages of considerable length.

Follower 42 comprises a horizontal plate-like member 43, the edges of which are received within guides 41 such that follower 42 is free to slide therewithin. A threaded gear-like member 44 having a number of arcuate spaced teeth 45 extends upwardly from the upper surface of follower 42 such that teeth 45 mesh with the threads of helical gear 40. Consequently, when helical gear 40 is rotated in either of the directions indicated by arrows 46, follower 42 will be driven linearly along rail 37.

Plate-like member 43 supports a downwardly extending hollow web section 47 which is attached by means of drive post 48 to the vertical surface of trolley 20 in order to propel trolley 20 along track 16 as follower 42 is driven along rail 37 by rotation of helical screw 40.

Vertical web 47 also supports adjustment means, shown generally at 49, for retracting gear-like member 44 out of engagement with helical screw 40. As best shown in FIG. 4–FIG. 7, retracting mechanism 49 includes a pair of studs 50 extending outwardly from a tab-like projection 51 depending from the lower edge of gear-like member 44. Studs 50 extend through elongated vertical slots, one of which is shown at 52, in the sides of vertical web member 47. A link member 53 is pivotally attached at its upper end to each outwardly projecting stud 50. The lower ends of link members 53 are pivotally secured by a cylindrical connecting pin 54 passing through suitably dimensioned apertures in both link members. The upper end of dogleg-shaped link member 55 is also pivotally attached to pin 54 intermediate the lower ends of link members 53. The lower end of link member 55 extends downwardly at an angle and forms a latch handle portion 56 which can be grasped by the operator's fingers to operate the retracting mechanism. A cylindrical pivot-pin 57 extends through the mid portion of link member 55, with the ends of pivot pin 57 being supported by suitably dimensioned apertures 58 in the sides of web member 47, such that link member 55 is free to pivot about pin 57. A pair of spaced compression springs 59 connect the ends of studs 50 with the ends of pivot pin 57.

FIG. 4 illustrates retracting mechanism 49 with gear-like member 44 in the extended or drive screw engaging position. As will be observed, the lower or latch handle end 56 of link member 55 has been moved to the left, thereby causing link member 53 to pivot in a counter clockwise direction and raise gear-like member 44 to its fully extended position, where it is held by the pressure exerted between link member 53 and link member 55. In FIG. 5, FIG. 7, the lower or latch handle end 56 of link member 55 has been moved to the right, causing link member 53 to rotate in a clockwise direction, thereby permitting gear-like member 44 to be urged downwardly by compression springs 59.

It will be observed that when gear-like member 44 is in its extended or helical screw engaging position, follower 43 and consequently trolley 20 will be traversed horizontally by the rotation of helical screw 40. However, when gear-like member 44 is in the retracted position, and consequently out of engagement with helical screw 40, follower 42 and trolley 20 are free to traverse horizontally independent of the rotation of helical screw 40. This latter operation is advantageous when header 12 must be moved manually to permit cleaning or repair.

As best shown in FIG. 2, helical screw 40 is rotated by means of a pulley 60 non-rotatably secured to one end of screw 40, which is driven from electric motor 61 in the desired direction by V-Belt 62. In general, the direction of rotation of motor 61 may be reversed by means of limit switches 63 and 64 located near the home and extended positions indicated at 65 and 66, respectively, of the traversing mechanism travel. Consequently, the direction of rotation of electric motor 61 will be such as to drive header 12 from home position 65 to extended position 66 whereupon trolley 20 abuts contact 67 of limit switch 64 to reverse the direction of rotation of motor 61 and return header 12 in the opposite direction to the home position 65. When trolley 20 has reached the home position, contact 68 of limit switch 63 will be activated by trolley 20 to again reverse the direction of rotation of electric motor 61 and propel trolley 20 in the opposite direction. As a result of this operation, header 12 may be traversed any number of times across the openings of air cleaners 4 in order to provide a spray of wash and rinse fluids to collecting plates 5. It will be understood that various cycles of wash and rinse operations may be provided by means not shown as required for particular applications during the traversing operation.

As shown in FIG. 1, the traversing mechanism is located within housing 10 out of the airstream associated with air cleaners 4 in order to minimize the amount of dirt that may be deposited on the operating components. Nonetheless, in some applications it has been found advantageous to provide additional sealing means between the traversing mechanism and the airstream. A preferred type of sealing means is shown in FIG. 3 and comprises an elongated flat resilient fluid impervious strip extending horizontally the width of the air cleaner support 2, and positioned between the traversing mechanism and the air cleaner airstream. Strip 69, which may be constructed of rubber or other resilient material, contains a central slit 70 extending the length of strip 69. Header 12 extends through slit 70, with the edges of the slit being in slidable sealing engagement with the outer surface of header 12. It will be observed that a relatively air and fluid tight seal is produced as header 12 moves through slit 70, with slit 70 returning to its closed position as the header passes. This arrangement prevents contaminated air and wash or rinse fluids from entering the space occupied by the traversing mechanism.

It will be understood that various changes in the details, materials, steps and arrangements of parts, which have been herein described and illustrated in order to explain the nature of the invention, may be made by those skilled in the art within the principle and scope of the invention as expressed in the appended claims.

The embodiments of the invention in which an exclusive property or pivilege is claimed are as follows:

1. An electrostatic precipitator air cleaner comprising a rack-like housing, at least one precipitator cell disposed within said housing, said cell including means for collecting airborne particles admitted into said cell and an air outlet adjacent said collecting means for exhausting an airstream comprising relatively clean air from said collecting means, a vertically disposed pipe-like spray header spaced adjacent to said collecting means, at least one spray nozzle attached to said header for directing a spray of wash or rinse fluid in order to remove said particles from said collecting means, means for supplying said fluid to said nozzle, and means for traversing said header horizontally across said precipitator cell, said traversing means comprising a rail-like guide member extending the width of said precipitator cell, a trolley supporting one end of said header and mounted for reciprocating movement along said guide member between a home position and an extended position, a horizontally mounted helical drive screw extending parallel to said guide member, rail-like drive screw support means extending parallel to said rail-like guide member for rotatably supporting said drive screw along substantially its entire length, means for rotating said screw, and a follower connected to said trolley containing a gear-like member engaging said screw, rotation of said screw producing linear motion of said follower to move said header across said precipitator cell.

2. The electrostatic precipitator according to claim 1 wherein said wash fluid supplying means comprises a swivel connection attached to one end of said header and a flexible hose-like conduit having one end connected to said swivel connection for supplying said wash fluid to said header, the other end of said conduit being fixed in relation to said trolley, whereby said conduit folds back upon itself as said trolley moves along said guide member.

3. The electrostatic precipitator according to claim 2 including a second swivel connection connected to said other end of said conduit such that both ends of said conduit are permitted to swivel about axes substantially parallel to the axis of said header.

4. The electrostatic precipitator according to claim 1 wherein the lower end of said header opposite said trolley is freely suspended.

5. The electrostatic precipitator according to claim 1 wherein said traversing means is positioned out of said airstream.

6. The electrostatic precipitator according to claim 1 including seal means surrounding said header and positioned between said traversing means and said airstream, said seal means permitting passage of said header but preventing infiltration of said airstream or said wash fluid into the area occupied by said traversing means.

7. The electrostatic precipitator according to claim 6 wherein said seal means comprises an elongated flat resilient fluid impervious strip extending the width of said precipitator beneath said traversing means, said strip containing a slit running longitudinally therealong, said header extending through said slit in sealing slidable engagement therewith such that the edges of said slit close together after passage of said header.

8. The electrostatic precipitator according to claim 1 wherein said trolley rotatably mounts a pair of spaced wheels supporting said trolley for rolling contact with said rail-like guide member.

9. The electrostatic precipitator according to claim 1 wherein said follower includes a horizontal plate-like member connected to said gear-like member, and said drive screw support includes a pair of spaced horizontal channel-like guides extending the length of trolley travel, the outer edges of said plate-like member being slidably supported by said guides.

10. The electrostatic precipitator according to claim 1 wherein said gear-like member includes adjustment means for engaging and disengaging said gear-like member from contact with said drive screw.

11. The electrostatic precipitator according to claim 10 wherein said adjustment means comprises a first link having one end pivotally connected to the lower edge of said gear-like member, a second link having one end pivotally secured to said first link at a point spaced from said pivotal connection, the end of said second link spaced from said pivotal securement forming a hand manipulated latch, said second link being pivotally connected intermediate said pivotal securement and said latch to said follower, and spring means urging said gear-like member out of engagement with said drive screw.

12. The electrostatic precipitator according to claim 1 wherein said header is pivotally attached to said trolley to permit movement of the header in directions transverse to the direction of header travel.

* * * * *